(12) United States Patent
Xu

(10) Patent No.: US 7,711,004 B2
(45) Date of Patent: May 4, 2010

(54) MULTIPLE BROADCAST CHANNELS FOR WIRELESS NETWORKS

(75) Inventor: Xiaode Xu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 642 days.

(21) Appl. No.: 11/379,107

(22) Filed: Apr. 18, 2006

(65) Prior Publication Data

US 2007/0242695 A1 Oct. 18, 2007

(51) Int. Cl.
*H04J 3/16* (2006.01)
(52) U.S. Cl. ............... 370/468; 370/338; 455/556; 455/566
(58) Field of Classification Search ......... 370/200–253, 370/272–309, 431–546
See application file for complete search history.

(56) References Cited

U.S. PATENT DOCUMENTS

| | | | | |
|---|---|---|---|---|
| 2002/0059623 | A1* | 5/2002 | Rodriguez et al. | 725/91 |
| 2002/0151327 | A1* | 10/2002 | Levitt | 455/556 |
| 2004/0190467 | A1 | 9/2004 | Liu et al. | 370/311 |
| 2005/0018624 | A1 | 1/2005 | Meier et al. | 370/318 |
| 2005/0124213 | A1 | 6/2005 | Hsu | 439/531 |
| 2005/0124313 | A1* | 6/2005 | Simpson et al. | 455/343.3 |
| 2005/0213576 | A1 | 9/2005 | Stephens | 370/390 |
| 2005/0237984 | A1 | 10/2005 | Benveniste | 370/338 |
| 2006/0029024 | A1 | 2/2006 | Zeng et al. | 370/335 |
| 2006/0062181 | A1 | 3/2006 | Chou | 370/329 |
| 2007/0242695 | A1* | 10/2007 | Xu | 370/468 |

OTHER PUBLICATIONS

PCT Search Report for PCT Application S/N: PCT/US2007/064605 mailed Dec. 21, 2007.
Y.P. Fallah and H.M. Alnuweiri: "Enhanced Controlled-Access and Contention-Based Algorithms for IEEE 802.11e Wireless LANs," Proceedings, 2005 International Conference on Wireless Networks, Communications and Mobile Computing, Jun. 13-16, 2005, vol. 1, pp. 409-414.
Y.P. Fallah, A. Elfeitori and H. Alnuweiri: "A Unified Scheduling Approach for Guaranteed Services over IEEE 802.11e Wireless LANs," Proceedings, First International Conference on Broadband Networks, 2004 "BroadNets 2004", pp. 375-384.
Ali Hamidian and Ulf Körner, "An Enhancement to the IEEE 802.11e EDCA Providing QoS Guarantees," Telecommunication Systems vol. 31, Issue 2-3, 2006.
Tat-Chee Wan and R. K. Subramanian: "Implementing QoS Support for Wireless Multicast Nodes," Proceedings International Conference on Communications (ICC 2004), Paris, France Jun. 20-24, 2004, pp. 3974-3978.

(Continued)

*Primary Examiner*—Ricky Ngo
*Assistant Examiner*—Iqbal Zaidi
(74) *Attorney, Agent, or Firm*—Dov Rosenfeld; INVENTEK

(57) ABSTRACT

An access point of a wireless network broadcasts directory information including a schedule on a first broadcast channel about media programs being broadcast on other channels by the access point. The broadcast on the first channel provides for sleep-mode clients to receive the broadcast. A client receives the schedule, and in order to receive a particular media program at a scheduled time switches to a particular one of the other channels and to wakeup state to receive a particular program.

41 Claims, 8 Drawing Sheets

OTHER PUBLICATIONS

Richard Akester: "Reducing Multicast Collision Loss for Digital TV Over 802.11 Wireless Networks," Presented at 4th WSEAS Int. Conf. on Multimedia, Internet and Video Technologies (ICOMIV 2004), Izmir, Turkey, Sep. 14-16, 2004 and published in WSEAS Transactions on Information Science and Applications, Issue 3, vol. 1, 2004, p. 903.

Richard Akester: "A Resilient Multicast Protocol for Digital TV Over 802.11 Wireless Networks," Presented at 4th WSEAS Int. Conf. on Multimedia, Internet and Video Technologies (ICOMIV 2004), Izmir, Turkey, Sep. 14-16, 2004 and published in WSEAS Transactions on Information Science and Applications, Issue 3, vol. 1, 2004, p. 908.

Shou-Chih Lo and Wen-Tsuen Chen: "An Efficient Scheduling Mechanism for IEEE 802.11e MAC Enhancements," Proceedings, 2004 IEEE Wireless Communications and Networking Conference (WCNC. 2004), vol. 2, Mar. 21-25, 2004 pp. 777-782.

M.T. Sun, L. Huang, A. Arora, and T.H. Lai: "Reliable MAC Layer Multicast in IEEE 802.11 Wireless Networks," In Proceedings of the 2002 IEEE International Conference on Parallel Processing (ICPP 2002), Vancouver, B.C., Canada, Aug. 2002, pp. 527-536.

\* cited by examiner

MULTIPLE BROADCAST CHANNELS FOR WIRELESS NETWORKS

BACKGROUND

The present invention is related to wireless networks, and in particular to a method and system for broadcasting media via a wireless local area network (WLAN) using a hierarchical channel structure.

Wireless local area networks (WLANs) such as wireless networks conforming to the IEEE 802.11 standard are being rapidly deployed, e.g., to provide users with access to corporate IT networks, and to provide access to the Internet. For example, WLANs are being deployed in office environments, hot spots such as airports, camping sites, cafes, etc., and also in municipalities in the form of outdoor mesh networks.

WLANs provide for unicast communication, and also provide for extending the MAC-level broadcast/multicast mechanism out to radio interfaces. Broadcast/multicast adaptation to WLAN works well for data. However, present day IEEE 802.11 multicast/broadcast is not well suited to dealing with time-sensitive applications such as audio and/or video (in general multimedia).

With the present day IEEE 802.11 standard, transmissions of broadcast/multicast data is required to line up with DTIM beacons so that power saving can be implemented. To allow more bandwidth for client communications, there can be multiple beacon intervals between two consecutive DTIM beacons. Such scheduling does not favor time-sensitive traffic such as voice and video.

In addition, with the present day IEEE 802.11 standard, the channel structure is flat. For purposes of broadcasting media data, it would be advantageous to broadcast a directory or other information about what media is being broadcast, as well as the actual media that the directory informs on. The existing IEEE 802.11 broadcast/multicast mechanism has no provision for such a hierarchy of information. The one plain, flat structure with absence of a directory makes it hard for users to select media to receive. It also would be advantageous to provide a mechanism for charging for programming. Having a hierarchy of information would provide for viewers to see what is being charged for what programming.

Thus there is a need in the art for a mechanism suitable for broadcasting media such as audio and/or video over wireless networks, e.g., WLANs.

SUMMARY

Described herein is a method, system, and protocol for providing a plurality of channel types for broadcasting media and information about the media. The information can include a directory, including a schedule and description of media programs. A media program as used herein includes one or more of a text message, a voice message, and a video message. For example, a media message may be a simple text announcement, a voice (audio) announcement, or an audio and video announcement such as a movie.

As WLAN use extends to being deployed at city-wide and community-wide hot spots, WLAN is becoming a suitable mechanism to broadcasting media, including audio and/or video announcements, event reminders, and movies, to end users. Aspects of the present invention aid in this endeavor by providing for a plurality of WLAN channel types for broadcasting media and for broadcasting information about the media. Such media can be offered for free, or for a fee.

One aspect of the invention is a method in an access point of a wireless network. The method includes wirelessly broadcasting, on a first channel, directory information about one or more media programs being broadcast on one or more other channels. The directory information includes a schedule of the media programs. The method further includes wirelessly broadcasting the one or more media programs on the one or more other channels according to the schedule of the media programs. In one embodiment, each media program includes one or more of a text message, a voice message, and a video message. While in the description herein the wireless network conforms to the IEEE 802.11 standard, the invention also is applicable to other wireless networks.

In one embodiment, at least one station of the access point is a power save station that alternates between a wakeup state during which the station can wirelessly receive downlink transmissions, and a doze state during which the station cannot receive downlink transmissions, and wherein the broadcasting on the first channel occurs in a manner such that power save client stations that are in sleep mode are able to receive the broadcast. In the case of 802.11 WLAN, the first channel should be lined up line with DTIM beacons to ensure power save client stations can receive this channel.

Another aspect of the invention is a method in a client station of an access point of a wireless network. The method includes wirelessly receiving on a first channel directory information broadcast from the access point about one or more media programs being broadcast on one or more other channels by the access point, including a schedule of the media programs and scheduling receiving of a particular media program on a particular channel according to the schedule of the media programs, the particular channel being different than the first channel. The method further includes receiving the particular media program broadcast on the particular channel by the access point.

Another aspect described herein is an apparatus in an access point of a wireless network. The apparatus includes means for wirelessly broadcasting, the means for wirelessly broadcasting configured to wirelessly broadcast, on a first channel, directory information about one or more media programs being broadcast on one or more other channels, including a schedule of the media programs; and further to wirelessly broadcast the one or more media programs on the one or more other channels according to the schedule of the media programs.

Another aspect of the invention is an apparatus in a client station of an access point of a wireless network. The apparatus includes means for wirelessly receiving, arranged in operation to wirelessly receive on a first channel directory information broadcast from the access point about one or more media programs being broadcast on one or more other channels by the access point, including a schedule of the media programs. The apparatus further includes means for scheduling the means for wirelessly receiving to receive a particular media program on a particular channel according to the schedule of the media programs, the particular channel being different than the first channel.

Another aspect of the invention is a computer-readable carrier medium carrying instructions that when executed by at least one processor of a processing system in an access point of a wireless network, cause the access point to implement any of the access point-implemented methods described herein.

Another aspect of the invention is a computer-readable carrier medium carrying instructions that when executed by at least one processor of a processing system in a client station of an access point of a wireless network, cause the client station to implement any of the client station-implemented methods described herein.

Another aspect is a method in a wireless network comprising: in an access point of a wireless network, broadcasting directory information including a schedule on a first broadcast channel about media programs being broadcast on other channels by the access point, the broadcast being in a manner that provides for sleep-mode clients to receive the broadcast directory information; and broadcasting the media programs in the other channels according to the schedule. In one embodiment, the method further comprises: in a client station of the access point, the client station having a doze state and a wakeup state, receiving the directory information including the schedule; and, in order to receive a particular media program at a scheduled time, switching to a particular one of the other channels and to wakeup state to receive a particular program.

Other aspects, features, and advantages of the invention will be clear from the description herein and the claims provided herein.

DETAILED DESCRIPTION

Described herein is a method, system, and protocol for providing a plurality of channel types for broadcasting media and information about the media via a wireless network such as a WLAN. The information can include a directory, including a schedule and a description of media programs.

Figure 1:
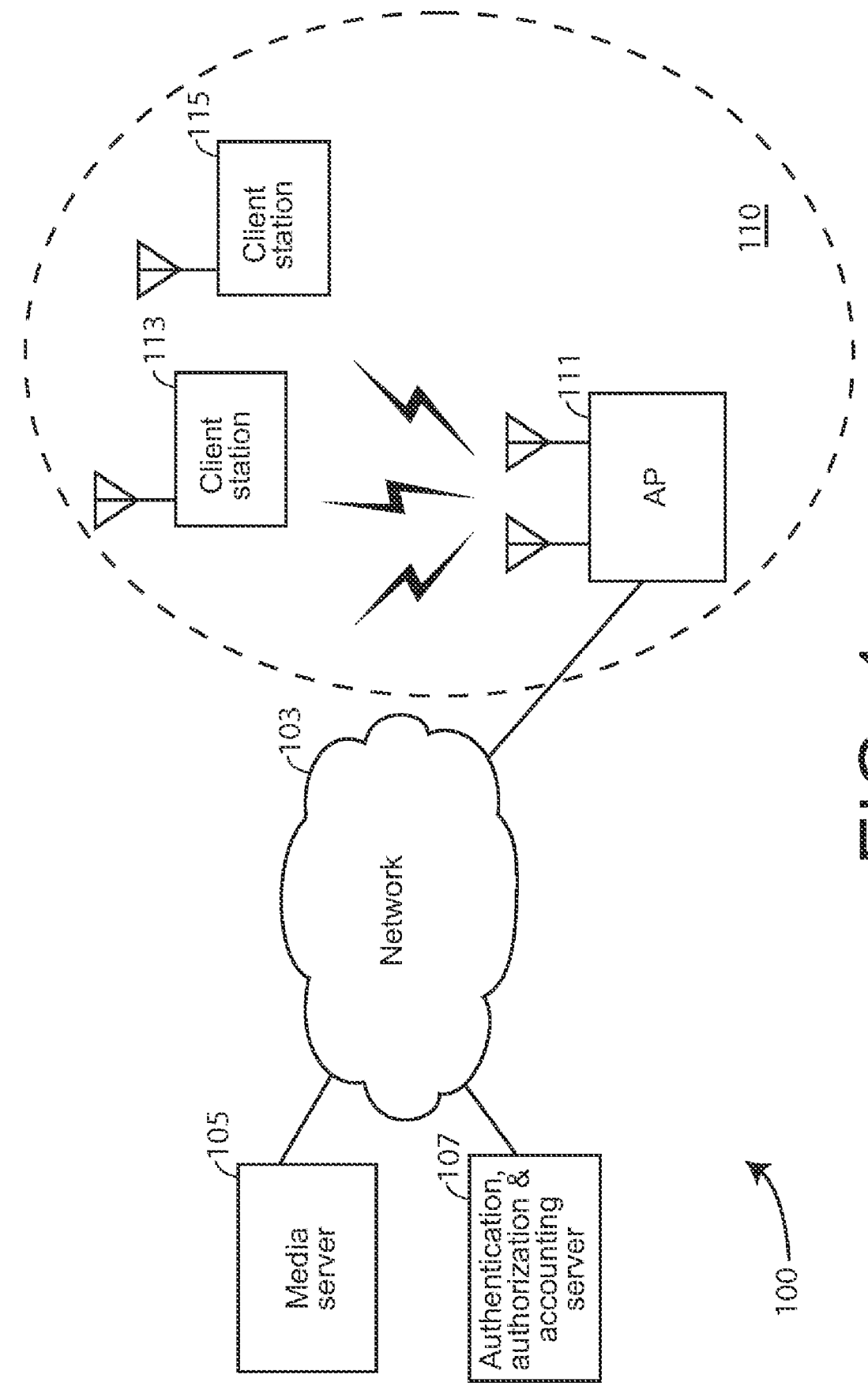
FIG. 1 shows a simplified block diagram of an exemplary network, including a wireless local area network in which an embodiment of the present invention operates.

While the exemplary network 100 shown in FIG. 1 is similar to a prior art network, such a network is not prior art when it includes one or more aspects of the present invention. The WLAN 110 is assumed to be a basic service set (BSS) operating according to one of the IEEE 802.11 standards, and includes an access point (AP) 111 and its client stations. Two client stations 113 and 115 are shown. The AP 111 is coupled to a network 103 that in turn is coupled to a media server 105 that stores media programming, and an authentication, authorization, and accounting (AAA) server 107 that authenticates, authorizes, and accounts for users of the WLAN. In some embodiments, the media server and AAA server are on a single network device.

Figure 2:
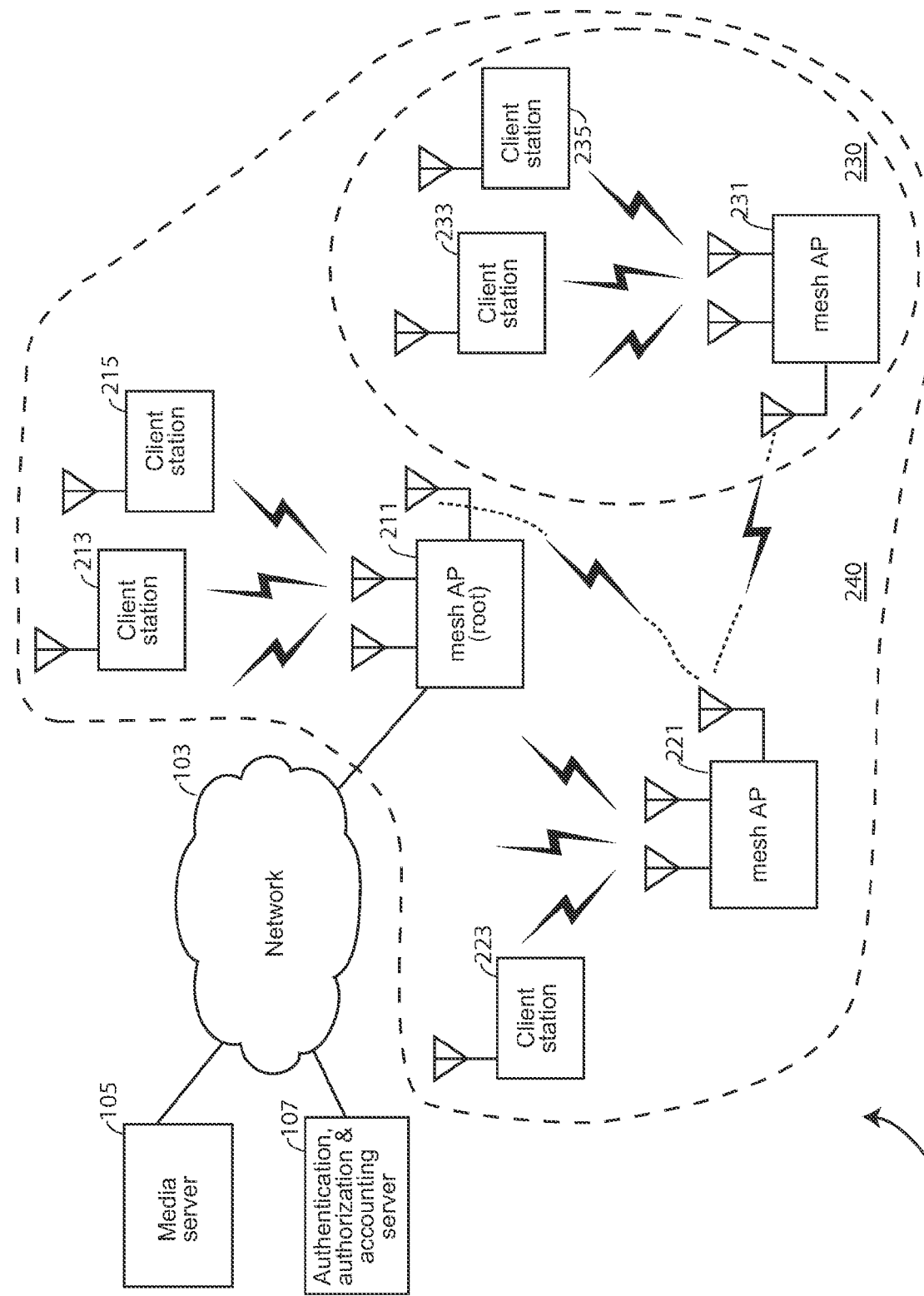
FIG. 2 shows a simplified block diagram of an exemplary network that includes a wireless mesh network in which an embodiment of the present invention operates.

FIG. 2 shows a simplified block diagram of an exemplary network 200 that includes a wireless mesh wireless network 240 in which an embodiment of the present invention can operate. While the exemplary network shown in FIG. 2 is similar to a prior art network, such a network is not prior art when it includes one or more aspects of the present invention. The mesh network has a set of mesh points which in the example shown are each also APs, so they are each called a mesh AP. Each mesh AP includes two radios, both operating according to IEEE 802.11 standards. A first radio, e.g., operating according to IEEE 802.11a, is used for communicating between the mesh points, and the other second radio is used to form a basic service set with a set of client stations, e.g., according to IEEE 802.11g. One of the mesh APs, in this example mesh AP 211, is a root of the mesh, and includes an uplink to a network, which in this example is the same network 103 as in FIG. 1. The other mesh APs are wirelessly linked to the root mesh AP 211 by their respective first radios, forming a tree topology according to methods known in the art. Each mesh AP can form a BSS. The root mesh AP 211 is shown with its client stations 213 and 215, mesh AP 221 is shown with a client station 223, and mesh AP 231 is shown with two client stations 233 and 235. As an example, mesh AP 231 and its two client stations 233 and 235 form a basic service set 230. Network 103 is coupled to a media server 105 that stores media programming, and an authentication, authorization, and accounting (AAA) server 107 that authenticates, authorizes, and accounts for users of the wireless mesh network. In some embodiments, the media server and AAA server are on a single network device. Optionally, the two radios stated above on a mesh AP may be accomplished with a single physical radio instead of two. A mesh network may also adopt a non-tree topology featuring multiple connection points into a backhaul network.

The remainder of the description mostly assumes the simple architecture of FIG. 1, and how to extend to a mesh architecture such as shown in FIG. 2 would be straightforward to those in the art.

Power Save Mode in WLANS

The IEEE 802.11 standard provides for what are called "power-save" wireless stations that alternate between a transient "wakeup" state during which the station can wirelessly receive downlink (access point to station) transmissions and a "doze" state during which the station is in a low-power consumption state and cannot receive downlink transmissions. The original (1999) IEEE 802.11 standard provides for the AP to note which client stations in the BSS are in the doze state, and to buffer packets for such clients in the doze state. An indication by an AP to one or more particular clients that data is buffered for those client(s), called a traffic indication map element (TIM), is used to make it possible for the AP to announce which client stations have data buffered. The TIM is sent with every beacon from the AP. Client stations that are in the doze state periodically switch to the wakeup state to listen for beacons, i.e., to ascertain if they receive beacon frames. Thus, an AP broadcasts frames containing indications to particular client(s) that data is buffered for the client(s) in the AP.

As in the present invention, there may be broadcast or multicast traffic buffered for client stations. On the AP side, if any client station is in the doze state, the AP buffers all broadcast and multicast traffic. Once in a while, the AP broadcasts a frame—a beacon frame—that includes an indication that broadcast or multicast traffic is buffered in the AP. We call such an indication a broadcast-buffered indication. In the case of the original 1999 IEEE 802.11 standard, the broadcast-buffered indication is called a delivery traffic indication map element (DTIM). Thus, an AP once in a while transmits a DTIM beacon. The AP then delivers any multicast or broadcast traffic that is buffered to all clients immediately following transmission of the DTIM-containing beacon.

Recall a TIM identifies the client stations for which traffic is pending and buffered in the AP, and this is coded in a partial virtual bitmap. In addition, according to the current 802.11 standard, the TIM contains an indication of whether multicast/broadcast traffic is buffered. While an AP sends a TIM with every beacon, a DTIM rather than an ordinary TIM is transmitted within a beacon every period called a DTIM period. After transmitting a DTIM, according to the 1999 IEEE 802.11 standard, an AP sends out any buffered broadcast or multicast traffic using normal frame transmission rules. Thus, standard broadcast and multicast traffic destined to the clients in the BSS is transmitted at the DTIM beacon boundary.

The IEEE 802.11e standard (2003) enhances the 1999 IEEE 802.11 standard by providing for delivery with Quality of Service (QoS), and therefore is suitable for delivering media such as audio (voice) and video. IEEE 802.11e provides for an enhancement of the original 802.11 power save mechanisms, called Automatic power save delivery (APSD). APSD is for a downlink frame deliver to a Quality of service enabled client station (QoS client station) from a Quality of service enabled AP (QoS AP). In the 802.11e standard, a traffic specification management (TSPEC) procedure is the primary mechanism for communication of QoS parameters. The present IEEE 802.11e standard defines Scheduled automatic power save delivery (S-APSD). A QoS client station and its QoS AP negotiate an automatic power save delivery schedule using add traffic stream (ADDTS) management frames that specify traffic by TSPECT. The negotiation is on the characteristics of traffic streams created by negotiation between the QoS client station and the hybrid coordination function (HC), carried out at the QoS AP. The hybrid coordination function can schedule the polling within a contention-free polling period and the data transmission of each traffic stream accordingly. The QoS AP starts transmitting frames of the specified traffic stream at what are called Service Start Times for what are called Service Periods. The hybrid coordinator in the AP aggregates TSPEC information and establishes periodic Service Periods for the QoS station by sending a "Schedule" element to the QoS station. The QoS client station needs to schedule itself to be in the wakeup state at the Service Start Time for the Service Period to receive the frames transmitted by the QoS AP.

The present day IEEE 802.11e standard does not describe setup for broadcast to QoS stations, e.g., to stations that are in the doze state. One aspect of the present invention is to use the scheduling mechanisms similar to that used for Scheduled automatic power save delivery for broadcasting from a QoS AP to one or more QoS client stations.

The Access Point, Client Stations, and Server(s)

Figure 3A:
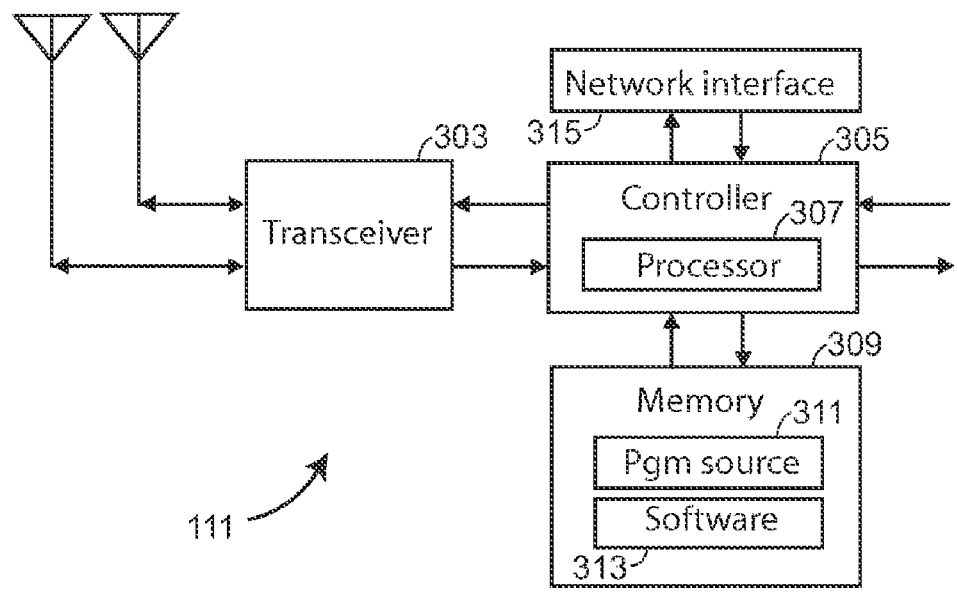
FIG. 3A shows a simplified block diagram of an exemplary access point that includes aspects of the present invention.

FIG. 3A shows a simplified block diagram of an exemplary access point that includes aspects of the present invention. For purposes of illustration, the access point is access point 111 of BSS 110 in FIG. 1. The components are typical of an access point as contemplated by the present invention. The access point 111 includes a transceiver 303 for transmitting and receiving IEEE 802.11 compliant packet data to and from client stations, and a controller 305 for controlling the operations of the access point 111. Typically, the controller 305 includes a microprocessor, shown here as processor 307. Memory 309 is used by the controller 305 for storage, and may include RAM (volatile and non-volatile), ROM, other types of memory, and combinations thereof. The typical access point 111 further includes a network interface 315 to send and receive messages from a network such as network 103 and/or for sending and receiving messages along a backbone between access points. The access point 111 in this example carries out the broadcasting of a directory program and also of individual media programs as described herein. The access point 111 in this example also receives media programs from the media content server 105. The memory 309 includes a program source data structure 311, e.g., in the form of a table, that stores the correspondence between programs being streamed from the program content server 105 to the AP, and the channels in which the individual programs are broadcast by the AP 111. In one embodiment, the controller is a programmable controller that includes a processing system having a processor. The memory 309 also includes software 313, e.g., instructions that when executed by the processor 307 of controller 305 cause the controller to implement one or more of the methods in an access point described herein. Note that there typically are other services and processes carried out in the access point 111. For example, the access point 111 may include a proxy ARP server that, in general, may be implemented in software, hardware, or a combination thereof, and in the exemplary access point 111 is implemented by the controller 305 controlled by instructions in software 313.

While the access point 111 is assumed to be a single access point that manages a single BSS, in other implementations, access point 111 can be a multiple BSS access point.

Figure 3B:
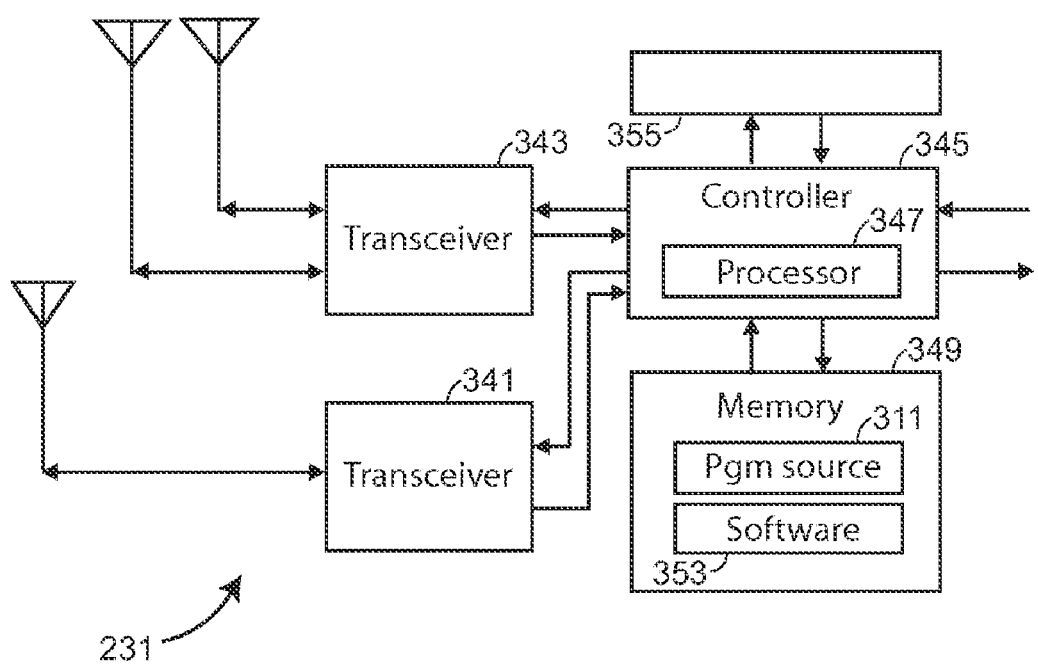
FIG. 3B shows a simplified block diagram of an exemplary access point that can act as a mesh access point, and that includes aspects of the present invention.

FIG. 3B shows a simplified block diagram of an exemplary access point that can act as a mesh access point, and that includes aspects of the present invention. For purposes of illustration, the access point is mesh access point 231 of BSS 230 in FIG. 2. The components are similar to that of the access point 111 of FIG. 3A, but with an additional transceiver 341 that is used to communicate between other mesh access points in the mesh, forming the backbone of the mesh. The other components are numbered differently because, e.g., their function may be slightly different. A transceiver 343 is included for transmitting and receiving IEEE 802.11 compliant packet data to and from client stations. Controller 305 and its processor 307 of FIG. 3A are numbered 345 and 347, respectively, and memory 309 of FIG. 3A is numbered 349. Network interface 315 of FIG. 3A is numbered 355, and is used, e.g., if the mesh access point has an uplink to the network 103, and is, for example a root access point. The mesh access point 231 in this example also receives media programs from the media content server 105. The memory 349 includes a program source data structure 311, e.g., in the form of a table, that stores the correspondence between programs being streamed from the program content server 105 to the mesh access point, and the channels in which the individual programs are broadcast by the mesh access point 231. In one embodiment, the controller is a programmable controller that includes a processing system having a processor 347. The memory 349 also includes software 353, e.g., instructions that when executed by the processor 347 of controller 345 cause the controller to implement one or more of the methods in an access point described herein. The memory 349 also stores information on the mesh network including how to discover neighbors to form the mesh topology for communicating between other mesh points.

Figure 4:
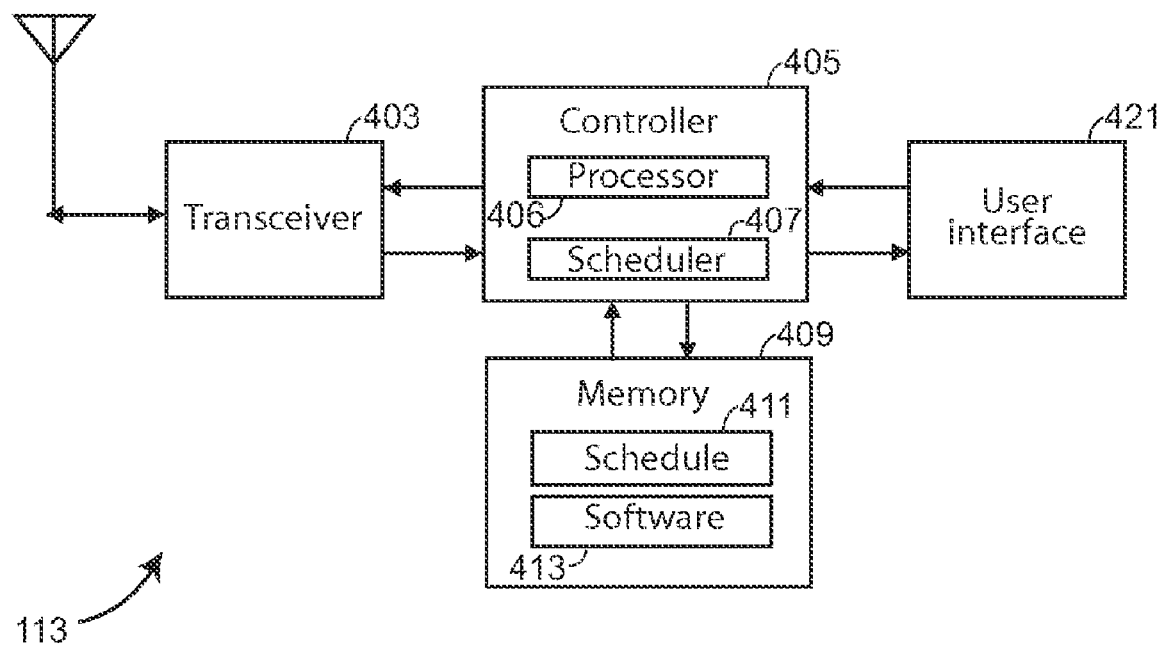
FIG. 4 shows a simplified block diagram of an exemplary client station that includes aspects of the present invention.

FIG. 4 shows a simplified block diagram of an exemplary client station that includes aspects of the present invention. For purposes of illustration, the client station is client station 113 of BSS 110 in FIG. 1. The components are typical of a wireless station as contemplated by the present invention. The client station 113 includes a transceiver 403 for transmitting and receiving IEEE 802.11 compliant packet data to and from its access point, e.g., access point 111, and a controller 405 for controlling the operations of the client station 113. Typically, the controller 405 includes a microprocessor, shown here as processor 406. Memory 409 is used by the controller 405 for storage, and may include RAM (volatile and non-volatile), ROM, other types of memory, and combinations thereof. The client station 113 in this example receives a program directory broadcast by its access point 111, provides the program data to a user, and as a result of user input, transmits requests to the access point to receive programs. The client station 113 in this example receives the media programs broadcast by the access point 111. The client station 113 further is a power-save wireless station that alternates between a wakeup state and a doze state. The client station 113 includes a scheduler 407 in the controller 405 to schedule wakeup and doze periods according to a schedule, and further to schedule switching to one or more particular channel(s) to view expected one or more media program(s). Scheduler 407 is typically implemented by processor 406. For purposes of the scheduling aspects of this invention, the memory 409 includes a schedule data structure 411, e.g., in the form of a table, that stores the start times and channel numbers of programs that are contemplated being received. The scheduler 407 schedules the wireless station 113 to switch from the doze state to the wakeup state at the appropriate times so that it can receive the individual media programs per the schedule data structure 411. The scheduler further schedules the wireless station 113 to switch to receiving at the channel(s) in which the individual programs are broadcast by the AP 111 at the scheduled time(s). In one embodiment, the controller is a programmable controller that includes a processing system having a processor. The memory 409 also includes software 413, e.g., instructions that when executed by the processor 406 of controller 405 cause the controller to implement one or more of the methods in an access point described herein. Note that there typically are other services and processes carried out in the client station 113.

One embodiment of the client station also includes a user interface 421 that enables presenting information to a user and receiving information from the user. The user interface includes one or more of a display, a loudspeaker, a headphone jack, and other known mechanisms for presenting information to the user. The user interface also includes one or more of a keyboard, a microphone working in conjunction with instructions in software 413 to recognize speech commands, cursor keys, and other known mechanisms for accepting information from the user.

Figure 5:
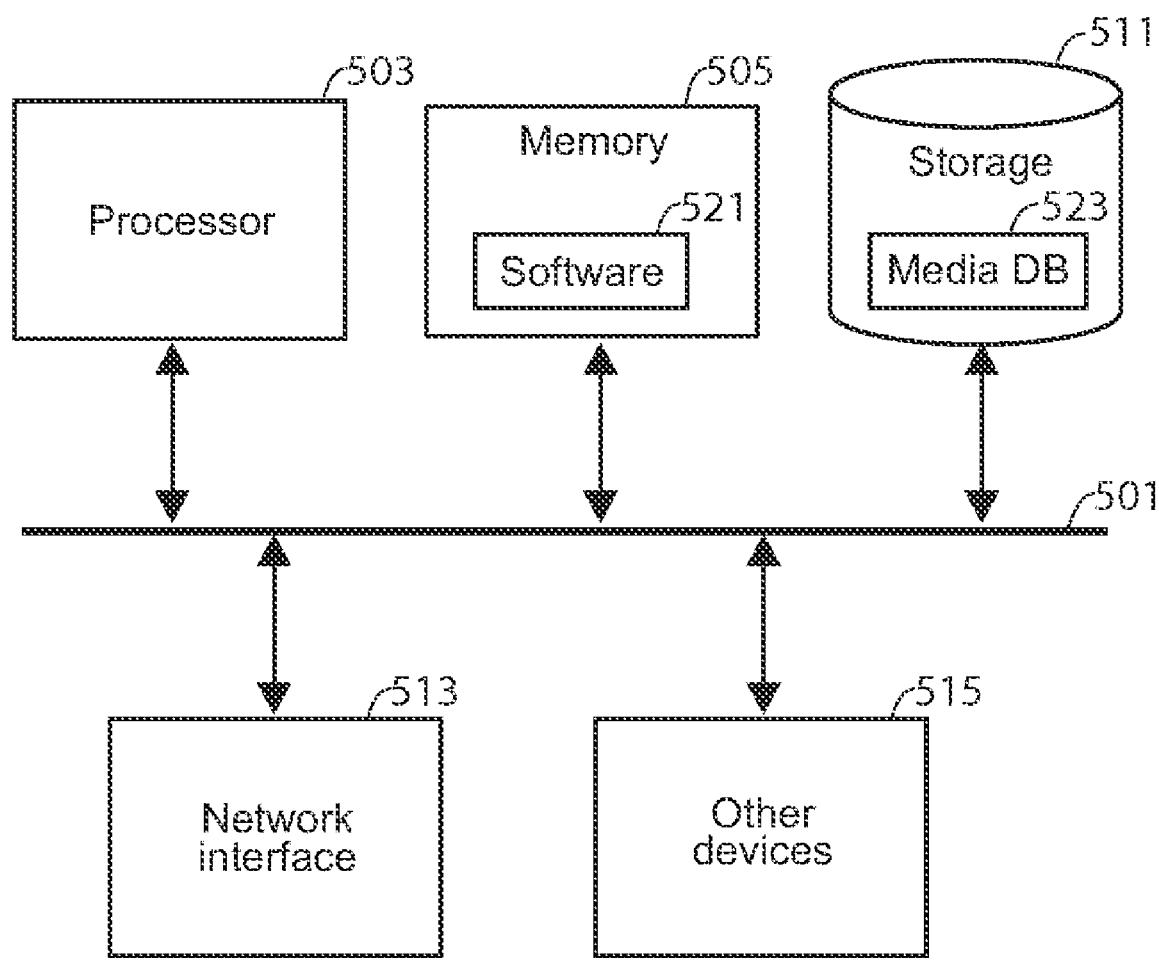
FIG. 5 shows a simplified block diagram of a media server that includes a processing system that in one embodiment also implements an authentication, authorization, and accounting server, and that performs authentication, authorization, and/or accounting according to an aspect of the present invention.

FIG. 5 shows a simplified block diagram of the media server 105, that includes a processing system that, in one embodiment, also implements the authentication, authorization, and accounting server 107. The media server 105 includes at least one processor 503 coupled to other components via a bus subsystem shown in simple form in FIG. 5 as 501. While a server such as shown in FIG. 5 is typically prior art, a server that includes one or more aspects of the present invention is not prior art. The components of the server include a memory subsystem 505 coupled to the processor via the bus subsystem 501, and a storage subsystem 511 coupled to the processor and other components via the bus subsystem 501. The storage subsystem 511 stores the media programs that are to be streamed. In one embodiment, the media programs are stored in storage subsystem 511 in the form of a media database 523. The media content server 105 includes a network interface 513 coupled to components via the bus subsystem 501, and also coupled to a network such as network 103 of FIGS. 1 and 2 to send and receive messages, e.g., to provide for streaming media programs to one or more access points. Other devices 515 also may be coupled to the processor via the bus subsystem, e.g., for performing other functions and services, such as switching. The memory is shown containing software 521, that may not be in memory subsystem 505 at the same time, but, as understood by those in the art, may be in the storage subsystem 511. The software 521 includes instructions that when executed by the processor 503 cause the server to stream programs to one or more access points, e.g., to access point 111 according to aspects described herein.

In the case that the server shown in FIG. 5 also acts as the authentication, authorization, and/or accounting server 107, software 521 also includes instructions that when executed by the processor 503 cause the server to carry out the authentication, authorization, and/or accounting services described herein for broadcasting a particular program to a particular client station of a particular access point.

Broadcasting Directory Information and Broadcasting Media Programs

Figure 6:
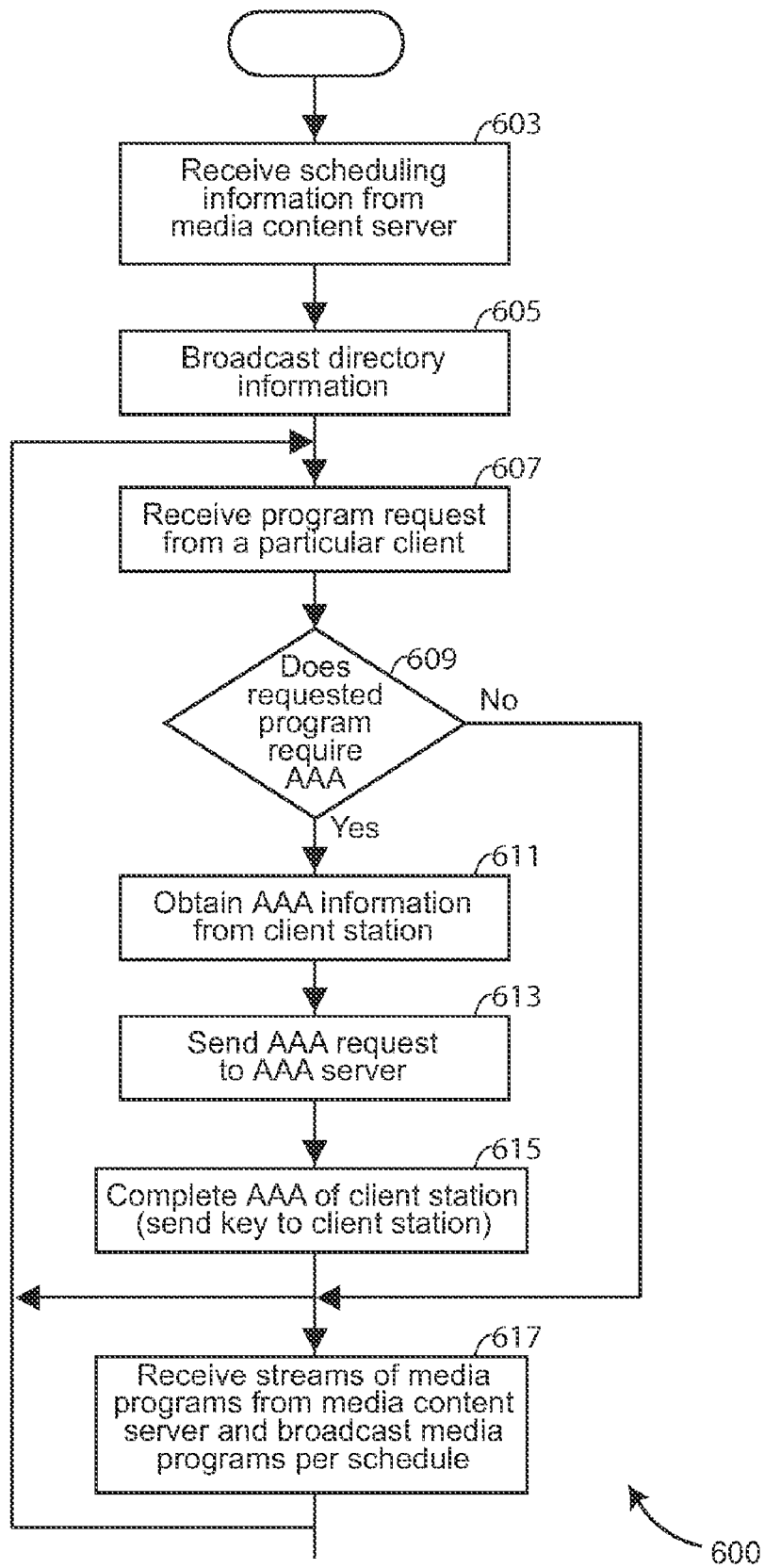
FIG. 6 shows a flowchart of a method embodiment at an access point, including aspects of the present invention.

In the system of FIG. 1, suppose that one or more media programs provided for broadcast, e.g., obtained from the multimedia server 105. FIG. 6 shows a flowchart of a method 600 at an access point, e.g., access point 111. In 603, the access point received scheduling information from the media content server 105. One aspect of the present invention is that an AP wirelessly broadcasts, on a first channel, information about the one or more media programs being broadcast on one or more other channels. This is shown as 605 in FIG. 6. Such information about the programs is called a directory herein, and includes in one embodiment for each program the start time, length of broadcast, repetition rate or period, the broadcast channel, and a description such as a title and a classification on the type of program. In the case that the program is one for which a use is charged, the charge for receiving the program also is included.

In one embodiment, at least one station of the access point is a power save station. The broadcasting on the first channel occurs in a manner such that power save client stations that are in sleep mode are able to receive the directory broadcast. As an example, the broadcasting on the first channel occurs immediately after the access point broadcasts a beacon frame that includes an indication of whether multicast or broadcast information is buffered at the access point. That is, in the case of the IEEE 802.11 standard, the broadcasting of the program directory occurs aligned with DTIM beacons in the same manner as standard IEEE 802.11 broadcasts.

In 617, the access point further receives the streams of media programs from the media content server 105 and wirelessly broadcasts the one or more media programs on the one or more other channels according to the schedule announced in the program directory. These other broadcast channels are dynamically added or removed according to the program schedule. The broadcasting of the programs on the additional broadcast channels occurs at times that are independent of DTIM beacons.

Figure 7:
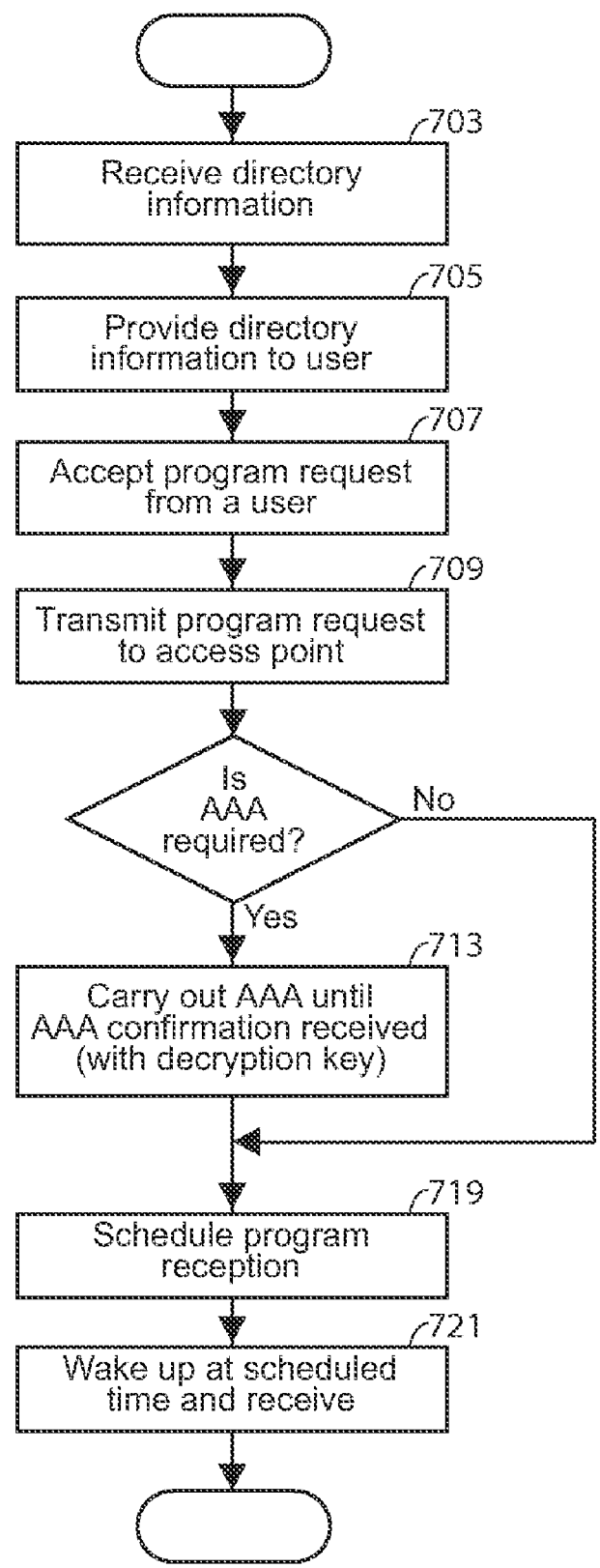
FIG. 7 shows a method of a method embodiment at a client station receiving information broadcast by an access point, including aspects of the present invention.

FIG. 7 shows a method 700 at a client station, e.g., client station 113 of the basic service set 110 in FIG. 1, of receiving the information broadcast by the access point, e.g., access point 111. In 703, the client station receives the directory information, and in 705 provides the directory information to a user via the user interface 421, e.g., as a display or in other form, e.g., voice playback. The user uses the presented program directory to decide which programs to receive and indicates this to the client station via the user interface 421. It is then up to the client station to be scheduled to receive these broadcasts on the appropriate channel, e.g., according to information in the program directory.

In one embodiment, in 707, the client station accepts the program request from the user provided via the user interface 421, and in 709, sends its access point, e.g., access point 111 an indication of the program(s) the client station will be listening to, as a program request. In the case there is authentication, authorization, and/or accounting (AAA) involved for a particular media program that is requested, in 713 the client station participates in the AAA. The result of AAA includes receiving AAA confirmation as a result of the access point authenticating, authorizing, and/or accounting for the client station's receiving the broadcast of particular media program. For example, if there is a charge for a particular media program, and the particular media program is broadcast encrypted, authorizing the client station includes sending the client station the decryption key required for decrypting the particular media program, so that at the end of 713, any needed decryption keys are available.

In 719, the client station, e.g., scheduler 407 of controller 405 (see FIG. 4) schedules the client station to switch to the wakeup state and switch to the appropriate channels to receive the requested media program(s). At 721, the client station switches to the wakeup state at the scheduled time, and switches to the appropriate channel to receive the broadcast of the program from the AP, such programs broadcast by the access point being in one embodiment streamed to the access point from the media content server 105.

Figure 8:
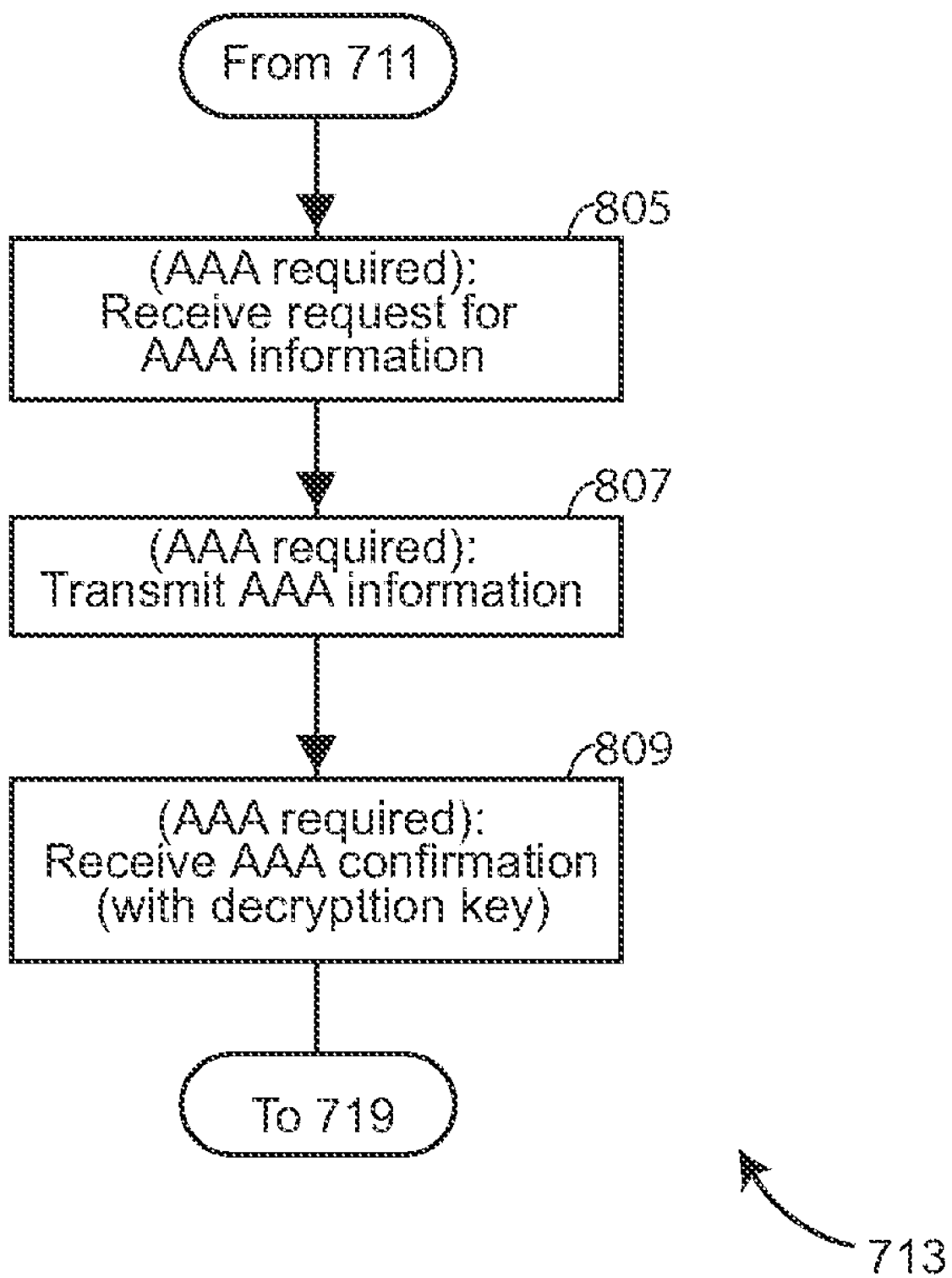
FIG. 8 shows in more detail the authentication, authorization, and/or accounting shown in FIG. 7, according to an aspect of the present invention.

FIG. 8 shows in more detail the AAA of 713. Referring also to FIG. 6 for that AAA part of the access point method 600, in 609, the access point ascertains if the media program request from the client station requires AAA. If so, in 611, the access point carries out an exchange with the client station, the corresponding client station part shown as 805 and 807 wherein the client station receives a request for AAA information, e.g., payment charge details in the case of a payment required, and sends the requested AAA information to the access point. In 613 of FIG. 6, the access point communicates with the AAA server 107 to complete the AAA process. In 615, the AAA process is completed. In the case that a decryption key is required by the client station, the access point sends the required decryption key to the client station as part of confirmation 615. Referring to FIG. 8, a confirmation of completion of the AAA process is received in the client station in 809, including for example, the decryption key in the case such a key is required for successful reception of the requested program.

Those in the art will understand that AAA process may require more or fewer steps, and the reader is referred, for example, to the relevant standards for AAA, e.g., the IEEE 802.11x standard for details on alternatives that may require more or fewer steps, as would be well known to those in the art.

The Directory Broadcast

The directory information broadcast includes for each media program on each channel: the title, e.g., descriptive of the media program, the start time of the media program, the media program time length, the channel number for the broadcast, and the repetition interval specifying how often the media program is to be repeated. In the case that there is a charge for any media program, the directory information includes the charge for the program.

Information for the directory is obtained in 603 (FIG. 6) by the access point from the media server. In one embodiment, the access point stores the information in program source database 311, e.g., as a table that stores the correspondence between programs being streamed from the program content server 105 to the access point, and the channels in which the individual programs are broadcast by the AP. In one embodiment, the program source database 311 includes scheduling information for particular programs, including in the case that there is a charge for any media program, the charge for the program.

A client station, e.g., client station 113 receives the directory broadcast (703 in FIG. 7). In one embodiment, in 705, the directory information is presented to a user in a user-receivable form on the user interface 421, e.g., as on a display in the client station, or by voice, and waits for user input on what program(s) the user wishes to receive. The user indicates the program or programs, e.g., on the user interface 421 of the client station.

Scheduling

The schedule for each program includes the start time, length of broadcast, repetition rate or interval, the broadcast channel, and a description such as a title and a classification on the type of program. In the case that the program is one for which a user is charged, the charge for successfully receiving, e.g., decrypting the program also is included.

As is understood by those in the art, in an 802.11 WLAN, a timing synchronization function (TSF) keeps the timers for all stations in the same infrastructure network synchronized. The AP is the timing master and performs the TSF. Each station maintains a local TSF timer. Each client station's TSF timer keeps running even when stations are in the doze state.

In one embodiment, the timing information in the directory information is broadcast to client stations, e.g., the start time, length of broadcast, and repetition interval is provided such that a receiving station's local TSF timer can use the times to schedule switching to wakeup and switching to receive on the appropriate channel. In one embodiment, in 719, the client station's scheduler 407 schedules the client station to switch to the wakeup state and switch to the appropriate channels to receive the requested media program at a time (TSF-start_play_time)mod(play_interval)=0, where start_play_time is the start play time for a program, and play_interval is the repetition period, such that the program starts playing at start_play_time, start_play_time+play_interval, start_play_time+2play_interval, . . . .

The media content server 105 selects start_play_time and play_interval according to the type of media program, e.g., the time sensitiveness of the media program, for example, for voice broadcast, play_interval may be set to 20000 corresponding to 20 ms. For text only announcement, the play_interval can be much larger e.g. 300000 corresponding to 300 ms. The media content server 105 further selects start_play_time and play_interval to ensure no overlap between different broadcast channels.

While the messaging for scheduling between the access point and the client station can be carried out by standard messages, another aspect of the invention is that the scheduling between the access point and the client station occurs using a modification of the scheduled automatic power save delivery (S-APSD). For more details on standard S-APSD, see the IEEE 802.11e standard. S-APSD is for unicasting.

Thus, aspects have been described that provide for broadcasting a directory of text announcements, voice announcements, movies and any other programs to client stations of a WLAN.

Note that while the description herein has been in terms of media programs, the term media programs includes simple text announcements.

Furthermore, note that while the description assumes that individual programs are streamed from the media content server 105 to the access point at the same time as the access point broadcasts such media programs, in alternate embodiments, the programs may be locally stored at the access point. This is especially applicable to simple programs such as text announcements.

Other alternative embodiments use other methods for scheduling. United States Patent Application US 20050124313 to Simpson et al. titled RECEPTION TIMING METHOD AND APPARATUS describes an access point receiving information as provided by various client station to provide a message, e.g., in a beacon transmission that reflects near term likely utilization of a shared communication resource—the wireless link. A client station can then use that information to schedule its own monitoring activity. This, in turn, permits the client station to schedule power saving activities to accommodate this reception schedule. This deals with a different problem—avoiding congestion by ensuring transmission by the access points are in a free period. However, the techniques described herein are readily adaptable to the scheduling of the present invention. When used in the present invention, a method in a client station is used to select a time to receive a broadcast from its access point by: receiving a beacon broadcast from the access point including first information that corresponds to times when there will be broadcasts, and using the first information to select a particular time to receive a media broadcast program from the access point using the shared wireless communication resource. The contents of United States Patent Application US 20050124313 are incorporated herein by reference.

The present invention also can be used to provide broadcasts that have a particular QoS. The scheduling described above using the modification to broadcast scheduling of S-APSD of the standard IEEE 802.11e process is one method. There has been work that is now known by those in the art on providing QoS not just for unicast communication as described in the IEEE 802.11e standard, but also in multicast, and by extension broadcasts. See Tat-Chee Wan and R. K. Subramanian: "Implementing QoS Support for Wireless Multicast Nodes," Proceedings International Conference on Communications (ICC 2004), Paris, France Jun. 20-24, 2004, Page(s): 3974-3978. The reader is referred to this paper for how to include such QoS.

The methodologies described herein are, in one embodiment, performable by a machine which includes a one or more processors that accept machine-executable instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable instructions, e.g., software, for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspects. For example, while only a single machine is illustrated, the term "machine" shall also be taken to include any collection of machines that individually or jointly execute a set (or multiple sets) of instructions to perform any one or more of the methodologies discussed herein.

Thus, one embodiment of some of the methods described herein is in the form of a computer program that executes on a processing system, e.g., a one or more processors that are part of wireless station such is an access point. Other embodiments of some of the methods described herein are in the form of a computer program that executes on a processing system, e.g., a one or more processors that are part of wireless station that is a client station. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium, e.g., a computer program product on a computer-readable storage medium carrying computer-readable instructions embodied in the medium.

The software may further be transmitted or received over a network via the network interface device. While the carrier medium is shown in an exemplary embodiment to be a single medium, the term "carrier medium" should be taken to include a single medium or multiple media, e.g., a centralized or distributed database, and/or associated caches and servers that store one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should be appreciated that although the invention has been described in the context of the IEEE 802.11 standard, the invention is not limited to such contexts and may be utilized in various wireless network applications and systems, for example in a system that uses packets other than IEEE 802.11 packets, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, WiMAX, and other wireless standards. Furthermore, while the invention has been presented with light access point connectable to a Controller, the invention is also implementable in other mesh wireless networks that require secure communication with a central controller.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method in an access point of a wireless network, the method comprising:
 (a) wirelessly broadcasting, on a first wireless network channel, directory information about one or more media programs being broadcast on one or more other wireless network channels, including a schedule of the media programs, the wireless broadcasting on the first wireless network channel being lined up with beacon frames containing a broadcast-buffered indication such that power saving can be implemented on any client associated with the access point and such that a power-save client station can receive the directory information, wherein at least one media program includes time-sensitive traffic including video and/or audio, and wherein the directory information includes for each program information indicative of at least one of: the start time, length of the to-be-broadcast program, repetition rate or period, the wireless network channel on which the broadcast is to occur, a description such as a title and a classification on the type of program, and/or, in the case that the program is one for which a user is charged, the charge for receiving the program; and (b) wirelessly broadcasting the one or more media programs on the one or more other wireless network channels according to the schedule of the media programs, the wireless broadcasting on the one or more other wireless network channels not being lined up with beacon frames containing a broadcast-buffered indication, such that the time-sensitive traffic can be broadcast by the access point on the one or more channels according to the directory information.

2. A method as recited in claim 1, wherein each media program includes one or more of a text message, a voice message, and a video message.

3. A method as recited in claim 1, wherein the wireless network conforms to the IEEE 802.11 standard, wherein the broadcast-buffered indication is a delivery traffic indication map element.

4. A method as recited in claim 1, wherein at least one station of the access point is a power save station that alternates between a wakeup state during which the station can wirelessly receive downlink transmissions and a doze state during which the station cannot receive downlink transmissions, and wherein the broadcasting on the first wireless network channel occurs lined up with beacon frames containing a broadcast-buffered indication for any power save station, such that any power save client station that is in sleep mode is able to receive the broadcast of the directory information.

5. A method as recited in claim 1, further comprising:

(c) receiving an indication from a particular client station that the particular client station will be receiving a particular media program according to the schedule in the information about the programs.

6. A method as recited in claim 5, further comprising:

(d) one or more of authenticating, authorizing, and accounting for the particular client station's receiving the broadcast.

7. A method as recited in claim 5, wherein the programs for broadcasting in (b) are streamed from a program content server, the method further comprising storing in the access point a data structure containing the correspondence between programs being streamed from the program content server to the access point, and the wireless network channels in which the programs are broadcast by the access point.

8. A method as recited in claim 6, wherein in the case there is a charge for the particular media program, and the particular media program is sent encrypted, (d) includes sending the particular client station a decryption key for decrypting the particular media program.

9. A method as recited in claim 5, wherein the directory information includes for each media program a title, the start time of the media program, the wireless network channel number for the broadcast, the repetition interval specifying how often the media program is to be repeated, and the case that there is a charge for the media program, the charge for the program.

10. A method in a client station of an access point of a wireless network, the method comprising:

(a) wirelessly receiving, on a first wireless network channel, directory information broadcast from the access point about one or more media programs being broadcast on one or more other wireless network channels by the access point, including a schedule of the media programs, the wireless broadcasting on the first wireless network channel being lined up with beacon frames containing a broadcast-buffered indication broadcast from the access point, such that in the case the client station is a power save client station that alternates between a wakeup state during which the client station can wirelessly receive downlink transmissions and a doze state during which the station cannot receive downlink transmissions, the client station can receive the directory information, wherein at least one media program includes time-sensitive traffic including one or more of video and/or audio, and wherein the directory information includes for each program information indicative of at least one of: the start time, length of the to-be-broadcast program, repetition rate or period, the wireless network channel on which the broadcast is to occur, a description such as a title and a classification on the type of program, and/or, in the case that the program is one for which a user is charged, the charge for receiving the program;

(b) scheduling receiving of a particular media program on a particular wireless network channel according to the schedule of the media programs, the particular wireless network channel being different than the first wireless network channel; and (c) receiving the particular media program broadcast on the particular wireless network channel by the access point, the wireless broadcasting on the particular wireless network channel not being lined up with beacon frames containing a broadcast-buffered indication, such that the time-sensitive traffic is broadcast on the one or more channels according to the directory information.

11. A method as recited in claim 10, wherein each media program includes one or more of a text message, a voice message, and a video message.

12. A method as recited in claim 10, wherein at least the client station is a power save station that alternates between a wakeup state during which the station can wirelessly receive downlink transmissions and a doze state during which the station cannot receive downlink transmissions, wherein the broadcasting on the first wireless network channel occurs lined up with beacon frames containing a broadcast-buffered indication for any power save station such that the power save client station as well as other power save stations can receive the directory information broadcast according to a broadcast power save mechanism, and wherein the scheduling of (b) includes scheduling to be in the wakeup state to receive the particular media program on the particular wireless network channel.

13. A method as recited in claim 10, further comprising:

(d) transmitting an indication to the access point of the particular media program according to the schedule in the information about the programs.

14. A method as recited in claim 13, further comprising:

(e) one or more of authenticating, authorizing, and accounting for the client station's receiving the broadcast.

15. A method as recited in claim 14, wherein in the case that there is a charge for the particular media program, and the particular media program is sent encrypted, (I) receiving a decryption key for decrypting the particular media program.

16. A method as recited in claim 13, further comprising:
prior to the transmitting of the indication in (d), providing a user with at least some of the directory information on a user interface; and
accepting via the user interface one or more selected programs from the user, including the particular program.

17. A method as recited in claim 13, wherein the directory information includes for each media program a title, the start time of the media program, the wireless network channel number for the broadcast, the repetition interval specifying how often the media program is to be repeated, and in the case that there is a charge for the media program, the charge for the program.

18. An apparatus in an access point of a wireless network, the apparatus comprising:
means for wirelessly broadcasting, the means for wirelessly broadcasting configured to wirelessly broadcast, on a first wireless network channel, directory information about one or more media programs being broadcast on one or more other wireless network channels, including a schedule of the media programs; and further to wirelessly broadcast the one or more media programs on the one or more other wireless network channels according to the schedule of the media programs, the wireless broadcasting on the first wireless network channel being lined up with beacon frames containing a broadcast-buffered indication such that power saving can be implemented on any client associated with the access point and such that a power-save client station can receive the directory information, the wireless broadcasting on the one or more other wireless network channels not being lined up with beacon frames containing a broadcast-buffered indication, such that the time-sensitive traffic can be broadcast by the access point on the one or more channels according to the directory information,
wherein at least one media program includes time-sensitive traffic including video and/or audio, and
wherein the directory information includes for each program information indicative of at least one of: the start time, length of the to-be-broadcast program, repetition rate or period, the wireless network channel on which the broadcast is to occur, a description such as a title and a classification on the type of program, and/or, in the case that the program is one for which a user is charged, the charge for receiving the program.

19. An apparatus as recited in claim 18, wherein each media program includes one or more of a text message, a voice message, and a video message.

20. An apparatus as recited in claim 18, wherein the wireless network conforms to the IEEE 802.11 standard, wherein the broadcast-buffered indication is a delivery traffic indication map element.

21. An apparatus as recited in claim 18, wherein at least one station of the access point is a power save station that alternates between a wakeup state during which the station can wirelessly receive downlink transmissions, and a doze state during which the station cannot receive downlink transmissions, and wherein the means for broadcasting is arranged, in operation to wirelessly broadcast on the first wireless network channel lined up with beacon frames containing a broadcast-buffered indication for any power save station, such that any power save client station that is in sleep mode is able to receive the broadcast of the directory information.

22. An apparatus as recited in claim 18, further comprising:
means for wirelessly receiving, arranged to receive an indication from a particular client station that the particular client station will be receiving a particular media program according to the schedule in the information about the programs.

23. An apparatus as recited in claim 22, further comprising:
means for carrying out one or more of authenticating, authorizing, and accounting for the particular client station's receiving the broadcast.

24. An apparatus as recited in claim 22, wherein the programs for broadcasting by the means for broadcasting are streamed from a program content server, the apparatus further comprising means for storing in the access point a data structure containing the correspondence between programs being streamed from the program content server to the access point, and the wireless network channels in which the programs are broadcast by the access point.

25. An apparatus in a client station of an access point of a wireless network, the apparatus comprising:
means for wirelessly receiving, arranged in operation to wirelessly receive, on a first wireless network channel, directory information broadcast from the access point about one or more media programs being broadcast on one or more other wireless network channels by the access point, including a schedule of the media programs, the wireless broadcasting on the first wireless network channel being lined up with beacon frames containing a broadcast-buffered indication broadcast from the access point, such that in the case the client station is a power save client station that alternates between a wakeup state during which the client station can wirelessly receive downlink transmissions and a doze state during which the station cannot receive downlink transmissions, the client station can receive the directory information,
wherein at least one media program includes time-sensitive traffic one or more of video and/or audio, and
wherein the directory information includes for each program information indicative of at least one of: the start time, length of the to-be-broadcast program, repetition rate or period, the wireless network channel on which the broadcast is to occur, a description such as a title and a classification on the type of program, and/or, in the case that the program is one for which a user is charged, the charge for receiving the program; and
means for scheduling the means for wirelessly receiving to receive a particular media program on a particular wireless network channel according to the schedule of the media programs, the particular wireless network channel being different than the first wireless network channel,
wherein the means for wirelessly receiving is further configured, in operation to receive the particular media program broadcast on the particular wireless network channel by the access point, the wireless broadcasting on the particular wireless network channel not being lined up with beacon frames containing a broadcast-buffered indication, such that the time-sensitive traffic is broadcast on the one or more channels according to the directory information.

26. An apparatus as recited in claim 25, wherein each media program includes one or more of a text message, a voice message, and a video message.

27. An apparatus as recited in claim 25, further comprising:
means for transmitting, arranged in operation to transmit an indication to the access point of the particular media program according to the schedule in the information about the programs.

28. An apparatus as recited in claim 27, further comprising:
means for presenting information to a user, arranged in operation to provide, prior to the transmitting of the indication, at least some of the directory information to the user;
means for accepting information from a user, arranged, on operation on a user interface providing; and
means for accepting information from the user, arranged, in operation, to accept one or more selected programs from the user, including the particular program.

29. A computer-readable storage medium on which are encoded instructions that when executed by at least one processor of a processing system in an access point of a wireless network, cause the access point to implement a method comprising:
(a) wirelessly broadcasting, on a first wireless network channel, directory information about one or more media programs being broadcast on one or more other wireless network channels, including a schedule of the media programs, the wireless broadcasting on the first wireless network channel being lined up with beacon frames containing a broadcast-buffered indication such that power saving can be implemented on any client associated with the access point and such that a power-save client station can receive the directory information,
wherein at least one media program includes time-sensitive traffic including video and/or audio, and
wherein the directory information includes for each program information indicative of at least one of: the start time, length of the to-be-broadcast program, repetition rate or period, the wireless network channel on which the broadcast is to occur, a description such as a title and a classification on the type of program, and/or, in the case that the program is one for which a user is charged, the charge for receiving the program; and
(b) wirelessly broadcasting the one or more media programs on the one or more other wireless network channels according to the schedule of the media programs, the wireless broadcasting on the one or more other wireless network channels not being lined up with beacon frames containing a broadcast-buffered indication, such that the time-sensitive traffic can be broadcast by the access point on the one or more channels according to the directory information.

30. A computer readable storage medium as recited in claim 29, wherein at least one station of the access point is a power save station that alternates between a wakeup state during which the station can wirelessly receive downlink transmissions and a doze state during which the station cannot receive downlink transmissions, and wherein the broadcasting on the first wireless network channel occurs lined up with beacon frames containing a broadcast-buffered indication for any power save station, such that any power save client station that in sleep mode is able to receive the broadcast of the directory information.

31. A computer readable storage medium as recited in claim 29, the method further comprising:
(c) receiving an indication from a particular client station that the particular client station will be receiving a particular media program according to the schedule in the information about the programs.

32. A computer readable storage medium as recited in claim 31, the method further comprising:
(d) one or more of authenticating, authorizing, and accounting for the particular client station's receiving the broadcast.

33. A computer readable storage medium as recited in claim 31, wherein the programs for broadcasting in (b) are streamed from a program content server, the method further comprising storing in the access point a data structure containing the correspondence between programs being streamed from the program content server to the access point, and the wireless network channels in which the programs are broadcast by the access point.

34. A computer readable storage medium as recited in claim 32, wherein in the case that there is a charge for the particular media program, and the particular media program is sent encrypted, (d) includes sending the particular client station a decryption key for decrypting the particular media program.

35. A computer-readable storage medium on which are encoded instructions that when executed by at least one processor of a processing system in a client station of an access point of a wireless network, cause the client station to implement a method comprising:
(a) wirelessly receiving, on a first wireless network channel, directory information broadcast from the access point about one or more media programs being broadcast on one or more other wireless network channels by the access point, including a schedule of the media programs, the wireless broadcasting on the first wireless network channel being lined up with beacon frames containing a broadcast-buffered indication broadcast from the access point, such that in the case the client station is a power save client station that alternates between a wakeup state during which the client station can wirelessly receive downlink transmissions and a doze state during which the station cannot receive downlink transmissions, the client station can receive the directory information,
wherein at least one media program includes time-sensitive traffic including one or more of video and/or audio, and
wherein the directory information includes for each program information indicative of at least one of: the staff time, length of the to-be-broadcast program, repetition rate or period, the wireless network channel on which the broadcast, is to occur a description such as a title and a classification on the type of program, and/or, in the case that the program is one for which a user is charged, the charge for receiving the program;
(b) scheduling receiving of a particular media program on a particular wireless network channel according to the schedule of the media programs, the particular wireless network channel being different than the first wireless network channel; and
(c) receiving the particular media program broadcast on the particular wireless network channel by the access point, the wireless broadcasting on the particular wireless network channel not being lined up with beacon frames containing a broadcast-buffered indication, such that the time-sensitive traffic is broadcast on the one or more channels according to the directory information.

36. A computer readable storage medium as recited in claim 35, wherein at least the client station is a power save station that alternates between a wakeup state during which the station can wirelessly receive downlink transmissions and a doze state during which the station cannot receive downlink transmissions, wherein the broadcasting on the first wireless network channel occurs lined up with beacon frames containing a broadcast-buffered indication for any power save station such that the power save client station as well as other power save stations can receive the directory information broadcast according to a broadcast power save mechanism, and wherein the scheduling of (b) includes scheduling to be in the wakeup state to receive the particular media program on the particular wireless network channel.

37. A computer readable storage medium as recited in claim 35, the method further comprising:
   (d) transmitting an indication to the access point of the particular media program according to the schedule in the information about the programs.

38. A computer readable storage medium as recited in claim 37, the method further comprising:
   (e) one or more of authenticating, authorizing, and accounting for the client station's receiving the broadcast.

39. A computer readable storage medium as recited in claim 37, the method further comprising:
   prior to the transmitting of the indication in (d), providing a user with at least some of the directory information on a user interface; and
   accepting via the user interface one or more selected programs from the user, including the particular program.

40. A method in a wireless network comprising:
   in an access point of a wireless network, sending broadcasts of directory information including a schedule on a first wireless network channel about media programs being broadcast on one or more other wireless network channels by the access point, the wireless broadcasting on the first wireless network channel being lined up with beacon frames containing a broadcast-buffered indication such that power saving can be implemented on any client associated with the access point and such that a power-save client station can receive the directory information; and
   wirelessly broadcasting the media programs in the one or more other wireless network channels according to the schedule of the media programs, the wireless broadcasting on the one or more other wireless network channels not being lined up with beacon frames containing a broadcast-buffered indication, such that the time-sensitive traffic can be broadcast by the access point on the one or more channels according to the directory information,
   wherein at least one media program includes time-sensitive traffic including video and/or audio, and
   wherein the directory information includes for each program information indicative of at least one of: the start time, length of the to-be-broadcast program, repetition rate or period, the wireless network channel on which the broadcast is to occur, a description such as a title and a classification on the type of program, and/or, in the case that the program is one for which a user is charged, the charge for receiving the program.

41. A method as recited in claim 40, further comprising:
   in a client station of the access point, the client station having a doze state and a wakeup state, receiving the directory information including the schedule; and, in order to receive a particular media program at a scheduled time, switching to a particular one of the other wireless network channels and to wakeup state to receive a particular program.

* * * * *

UNITED STATES PATENT AND TRADEMARK OFFICE
CERTIFICATE OF CORRECTION

PATENT NO. : 7,711,004 B2
APPLICATION NO. : 11/379107
DATED : May 4, 2010
INVENTOR(S) : Xu

It is certified that error appears in the above-identified patent and that said Letters Patent is hereby corrected as shown below:

In Column 17, line 1, kindly replace "(I)" with --(f)--

Signed and Sealed this

Third Day of August, 2010

David J. Kappos
*Director of the United States Patent and Trademark Office*